United States Patent
Zhang

(10) Patent No.: US 11,342,765 B2
(45) Date of Patent: May 24, 2022

(54) TERMINAL, POWER ADAPTER AND METHOD FOR HANDLING CHARGING ANOMALY

(71) Applicant: GUANGDONG OPPO MOBILE TELECOMMUNICATIONS CORP., LTD., Dongguan (CN)

(72) Inventor: Jialiang Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 427 days.

(21) Appl. No.: 15/115,013

(22) PCT Filed: Jan. 9, 2015

(86) PCT No.: PCT/CN2015/070468
§ 371 (c)(1),
(2) Date: Jul. 28, 2016

(87) PCT Pub. No.: WO2015/113465
PCT Pub. Date: Aug. 6, 2015

(65) Prior Publication Data
US 2016/0352117 A1    Dec. 1, 2016

(30) Foreign Application Priority Data

Jan. 28, 2014  (CN) .......................... 201410042541.0
Jan. 28, 2014  (CN) .......................... 201410043139.4
Jan. 28, 2014  (CN) .......................... 201410043218.5

(51) Int. Cl.
*H02J 7/00* (2006.01)
*H02J 7/02* (2016.01)
*H02J 7/04* (2006.01)

(52) U.S. Cl.
CPC .............. *H02J 7/0031* (2013.01); *H02J 7/00* (2013.01); *H02J 7/0029* (2013.01);
(Continued)

(58) Field of Classification Search
CPC ....... Y02E 60/12; H02J 7/0042; H02J 7/0045; H02J 7/0031; H02J 7/0029; H02J 7/0057;
(Continued)

(56) References Cited

U.S. PATENT DOCUMENTS 3,927,361 A   12/1975  Macharg
5,028,859 A    7/1991  Johnson et al.
(Continued)

FOREIGN PATENT DOCUMENTS

CN   1163500 A   10/1997
CN   1499689 A    5/2004
(Continued)

OTHER PUBLICATIONS

Japanese Patent Application No. 2016-549265 Notification of Reasons for Refusal dated Oct. 31, 2017, 4 pages.
(Continued)

*Primary Examiner* — Richard Isla
*Assistant Examiner* — Mohammed J Sharief
(74) *Attorney, Agent, or Firm* — Lathrop PGM LLP

(57) ABSTRACT

A terminal, a power adapter, and a method for handling a charging anomaly are provided. The terminal includes a battery and a charging interface. The terminal forms a charging loop with the power adapter via the charging interface. The terminal also includes a communication unit, an anomaly detection unit, and an anomaly handling unit. The communications unit receives charging parameter information from the power adapter. The handling detection unit determines whether an anomaly occurs on the charging loop according to the charging parameter information. When the
(Continued)

A terminal receives charging parameter information from a power adapter — 310

The terminal, according to the charging parameter information, determines whether an anomaly occurs on a charging loop between the terminal and the power adapter — 320

The terminal controls the charging loop to enter into a protection state if the anomaly occurs on the charging loop — 330 anomaly occurs on the charging loop, the anomaly handling unit controls the charging loop to enter into a protection state. Therefore, the security of the charging process is improved.

6 Claims, 2 Drawing Sheets

(52) U.S. Cl.
CPC ........ *H02J 7/00036* (2020.01); *H02J 7/0069* (2020.01); *H02J 7/027* (2013.01); *H02J 7/042* (2013.01); *H02J 7/00034* (2020.01); *H02J 7/00302* (2020.01); *H02J 7/00304* (2020.01)

(58) Field of Classification Search
CPC .... H02J 7/042; H02J 7/027; H02J 7/00; H02J 2007/0039; H02J 2007/0037; H02J 2007/0096; H02J 2007/0062; H01M 10/44; H01M 10/46
USPC ........................................... 320/107
See application file for complete search history.

(56) References Cited

U.S. PATENT DOCUMENTS

| | | | |
|---|---|---|---|
| 5,229,705 A | 7/1993 | Kato | |
| 5,254,931 A | 10/1993 | Martensson | |
| 5,541,489 A | 7/1996 | Dunstan | |
| 5,905,362 A | 5/1999 | Nagano et al. | |
| 6,025,695 A | 2/2000 | Friel et al. | |
| 7,271,568 B2 | 9/2007 | Purdy et al. | |
| 7,378,755 B2 | 5/2008 | Kingsmore, Jr. et al. | |
| 7,932,694 B2 | 4/2011 | Watanabe et al. | |
| 8,098,053 B2 | 1/2012 | Sato | |
| 8,513,923 B2 | 8/2013 | Wang et al. | |
| 10,008,868 B2 | 6/2018 | Zhang et al. | |
| 10,218,192 B2 | 2/2019 | Zhang et al. | |
| 2001/0006338 A1 | 7/2001 | Yamashita | |
| 2001/0021092 A1 | 9/2001 | Astala | |
| 2002/0098859 A1 | 7/2002 | Murata | |
| 2004/0189251 A1* | 9/2004 | Kutkut | H02J 7/022 320/128 |
| 2005/0077878 A1 | 4/2005 | Carrier et al. | |
| 2005/0174094 A1 | 8/2005 | Purdy et al. | |
| 2006/0093916 A1 | 5/2006 | Howard et al. | |
| 2006/0152196 A1 | 7/2006 | Matsumoto et al. | |
| 2006/0170398 A1 | 8/2006 | Gangsto et al. | |
| 2006/0234125 A1 | 10/2006 | Valle | |
| 2007/0118272 A1* | 5/2007 | Shimada | H02J 7/166 701/114 |
| 2007/0188134 A1* | 8/2007 | Hussain | H01M 10/44 320/114 |
| 2007/0230227 A1 | 10/2007 | Palmer | |
| 2008/0111520 A1 | 5/2008 | Sasaki | |
| 2008/0224662 A1 | 9/2008 | Hayakawa | |
| 2008/0224667 A1* | 9/2008 | Tanaka | H01M 10/44 320/139 |
| 2008/0231236 A1 | 9/2008 | Watanabe et al. | |
| 2008/0238370 A1* | 10/2008 | Carrier | H02J 7/00036 320/134 |
| 2008/0287080 A1 | 11/2008 | Camp, Jr. et al. | |
| 2009/0135633 A1 | 5/2009 | Ikeuchi et al. | |
| 2009/0153100 A1 | 6/2009 | Okumura et al. | |
| 2009/0184688 A1* | 7/2009 | Kim | G06F 1/26 320/162 |
| 2009/0243552 A1 | 10/2009 | Jakes et al. | |
| 2010/0033139 A1 | 2/2010 | An | |
| 2010/0045243 A1 | 2/2010 | Mizuno et al. | |
| 2010/0066311 A1 | 3/2010 | Bao et al. | |
| 2010/0085020 A1 | 4/2010 | Suzuki et al. | |
| 2010/0085022 A1 | 4/2010 | Shimizu et al. | |
| 2010/0165528 A1 | 7/2010 | Chan | |
| 2010/0188237 A1 | 7/2010 | Monks et al. | |
| 2010/0253291 A1* | 10/2010 | Lin | H02J 7/0029 320/152 |
| 2010/0308775 A1 | 12/2010 | Mizutani et al. | |
| 2011/0057605 A1 | 3/2011 | Chung et al. | |
| 2011/0057620 A1* | 3/2011 | Tsai | H02J 7/0029 320/134 |
| 2011/0248670 A1 | 10/2011 | Yamazaki et al. | |
| 2011/0266874 A1 | 11/2011 | Soemantri et al. | |
| 2012/0038317 A1* | 2/2012 | Miyamoto | H02J 7/025 320/108 |
| 2012/0098495 A1 | 4/2012 | Yang et al. | |
| 2012/0133336 A1 | 5/2012 | Han et al. | |
| 2012/0293009 A1 | 11/2012 | Kim et al. | |
| 2013/0002200 A1 | 1/2013 | Kobayishi | |
| 2013/0007336 A1 | 1/2013 | Chun et al. | |
| 2013/0063271 A1 | 3/2013 | Yasuda et al. | |
| 2013/0082662 A1 | 4/2013 | Carré et al. | |
| 2013/0154547 A1 | 6/2013 | Wada | |
| 2013/0175978 A1 | 7/2013 | Hsiao | |
| 2013/0198535 A1 | 8/2013 | Takashima | |
| 2013/0207592 A1 | 8/2013 | Okada | |
| 2013/0214611 A1 | 8/2013 | Bae | |
| 2013/0254560 A1 | 9/2013 | Leung | |
| 2013/0314830 A1 | 11/2013 | Zamprogno | |
| 2014/0013012 A1* | 1/2014 | Terlizzi | G06F 13/38 710/15 |
| 2014/0181541 A1* | 6/2014 | Matsumoto | H02J 7/0031 713/300 |
| 2014/0313794 A1 | 10/2014 | Ono et al. | |
| 2016/0352117 A1 | 12/2016 | Zhang | |

FOREIGN PATENT DOCUMENTS

| | | | |
|---|---|---|---|
| CN | 1950998 A | 4/2007 | |
| CN | 1989675 A | 6/2007 | |
| CN | 101013764 A | 8/2007 | |
| CN | 101026309 A | 8/2007 | |
| CN | 201207574 Y | 3/2009 | |
| CN | 201278420 Y | 7/2009 | |
| CN | 101651356 A | 2/2010 | |
| CN | 101714772 A | 5/2010 | |
| CN | 101783427 A | 7/2010 | |
| CN | 101888098 A | 11/2010 | |
| CN | 101908771 A | 12/2010 | |
| CN | 101939893 A | 1/2011 | |
| CN | 102013705 A | 4/2011 | |
| CN | 102214941 A | 10/2011 | |
| CN | 202218051 U | 5/2012 | |
| CN | 102931693 A | 2/2013 | |
| CN | 103178595 A | 6/2013 | |
| CN | 103236568 A | 8/2013 | |
| CN | 103370863 A | 10/2013 | |
| CN | 103762691 A | 4/2014 | |
| CN | 103779907 A | 5/2014 | |
| CN | 103795040 A | 5/2014 | |
| CN | 203747392 U | 7/2014 | |
| CN | 203747451 U | 7/2014 | |
| CN | 203747452 U | 7/2014 | |
| CN | 203747453 U | 7/2014 | |
| EP | 0 800 253 A2 | 10/1997 | |
| EP | 0800253 A2 | 10/1997 | |
| EP | 1455431 A | 9/2004 | |
| EP | 1796243 A2 | 6/2007 | |
| EP | 1796243 A2 * | 6/2007 | ................ H02J 7/04 |
| EP | 1 821 384 A2 | 8/2007 | |
| EP | 1821384 A2 | 8/2007 | |
| EP | 2071696 A | 6/2009 | |
| EP | 2175542 A2 | 4/2010 | |
| EP | 2239810 A1 | 10/2010 | |
| EP | 2256897 A1 | 12/2010 | |
| EP | 2618419 A2 | 7/2013 | |
| GB | 2251515 A | 7/1992 | |
| JP | H09168241 A | 6/1997 | |
| JP | H11143591 A | 5/1999 | |
| JP | H11215727 A | 8/1999 | |
| JP | 2003033034 A | 1/2003 | |
| JP | 2004274875 A | 9/2004 | |

(56) References Cited

FOREIGN PATENT DOCUMENTS

| | | | |
|---|---|---|---|
| JP | 2007020203 A | 1/2007 | |
| JP | 2007110853 A | 4/2007 | |
| JP | 2007327772 A | 12/2007 | |
| JP | 2008009898 A | 1/2008 | |
| JP | 2008035674 A | 2/2008 | |
| JP | 2008061343 A | 3/2008 | |
| JP | 2008061381 A | 3/2008 | |
| JP | 2010058244 A | 3/2010 | |
| JP | 2010093912 A | 4/2010 | |
| JP | 2010154692 A | 7/2010 | |
| JP | 2010165347 A | 7/2010 | |
| JP | 2013108793 A | 6/2013 | |
| JP | 2013-132183 A | 7/2013 | |
| JP | 2013132183 A | 7/2013 | |
| JP | 2013134683 A | 7/2013 | |
| JP | 2013198262 A | 9/2013 | |
| KR | 20040024552 A | 3/2004 | |
| KR | 20080034141 A | 4/2008 | |
| KR | 20130002970 A | 1/2013 | |
| WO | 1999/005766 A1 | 2/1999 | |
| WO | 2007/043250 A1 | 4/2007 | |
| WO | WO 2010117498 A2 | 10/2010 | |
| WO | WO 2012165071 A1 | 12/2012 | |
| WO | WO 2013001909 A1 | 1/2013 | |
| WO | WO 2014200939 A1 | 12/2014 | |

OTHER PUBLICATIONS

Japanese Patent Application No. 2016-549265 English translation of Notification of Reasons for Refusal dated Oct. 31, 2017, 3 pages.
Chilean Patent Application No. 201601924 Office Action dated Sep. 13, 2017, 5 pages.
Office Action corresponding to Australian Patent Application No. 2015210567, dated Aug. 7, 2017.
Office Action corresponding to Chinese Patent Application No. 201410043218.5, dated May 25, 2015—Search Results on p. 4 only.
Office Action corresponding to European Patent Application No. 15744077.7, dated Jul. 3, 2017.
Office Action corresponding to Japanese Patent Application No. 2016-549265, dated Aug. 2, 2017—with English translation.
Chilean Patent Application No. 201601915 Office Action dated Oct. 19, 2017, 7 pages.
Chilean Patent Application No. 201700970 Office Action dated Apr. 19, 2018, 9 pages.
Chinese Patent Application No. 201410042541.0 Office Action dated Jul. 17, 2015, 5 pages.
Chinese Patent Application No. 201410042541.0 English translation of Office Action dated Jul. 17, 2015, 5 pages.
Chinese Patent Application No. 201410042541.0 Office Action dated Mar. 16, 2016, 3 pages.
Chinese Patent Application No. 201410042541.0 English translation of Office Action dated Mar. 16, 2016, 4 pages.
Chinese Patent Application No. 201410043139.4 Office Action dated Dec. 23, 2015, 3 pages.
Chinese Patent Application No. 201410043139.4 English translation of Office Action dated Dec. 23, 2015, 5 pages.
Chinese Patent Application No. 201410043218.5 Office Action dated May 25, 2015, 5 pages.
Chinese Patent Application No. 201410043218.5 English translation of Office Action dated May 25, 2015, 5 pages.
Chinese Patent Application No. 201610763798.4 Office Action dated Jun. 15, 2017, 5 pages.
Chinese Patent Application No. 201610763798.4 English translation of Office Action dated Jun. 15, 2017, 8 pages.
Chinese Patent Application No. 201610763798.4 Office Action dated Sep. 19, 2017, 6 pages.
Chinese Patent Application No. 201610763798.4 English translation of Office Action dated Sep. 19, 2017, 9 pages.
Chinese Patent Application No. 201610763798.4 Office Action dated Jan. 11, 2018, 5 pages.
Chinese Patent Application No. 201610763798.4 English translation of Office Action dated Jan. 11, 2018, 5 pages.
Chinese Patent Application No. 201610973222.0 Office Action dated Jun. 1, 2017, 4 pages.
Chinese Patent Application No. 201610973222.0 English translation of Office Action dated Jun. 1, 2017, 6 pages.
Chinese Patent Application No. 201610973222.0 Office Action dated Jul. 13, 2017, 4 pages.
Chinese Patent Application No. 201610973222.0 English translation of Office Action dated Jul. 13, 2017, 6 pages.
Chinese Patent Application No. 201610973222.0 Office Action dated Sep. 25, 2017, 6 pages.
Chinese Patent Application No. 201610973222.0 English translation of Office Action dated Sep. 25, 2017, 9 pages.
European Patent Application No. 14881017.9 extended Search and Opinion dated Nov. 23, 2017, 7 pages.
European Patent Application No. 14881229.0 extended Search and Opinion dated Sep. 6, 2017, 8 pages.
European Patent Application No. 14880730.8 extended Search and Opinion dated Oct. 24, 2017, 7 pages.
European Patent Application No. 18174633.0 extended Search and Opinion dated Aug. 9, 2018, 7 pages.
Japanese Patent Application No. 2016549501 Office Action dated Nov. 14, 2017, 2 pages.
Japanese Patent Application No. 2016549501 English translation of Office Action dated Nov. 14, 2017, 2 pages.
Japanese Patent Application No. 2016549390 Office Action dated Aug. 8, 2017, 3 pages.
Japanese Patent Application No. 2016549390 English translation of Office Action dated Aug. 8, 2017, 3 pages.
Japanese Patent Application No. 2017215256 Office Action dated Dec. 5, 2017, 3 pages.
Japanese Patent Application No. 2017215256 English translation of Office Action dated Dec. 5, 2017, 3 pages.
Korean Patent Application No. 20167023621 Office Action dated Aug. 9, 2017, 3 pages.
Korean Patent Application No. 20167023621 English translation of Office Action dated Aug. 9, 2017, 2 pages.
Korean Patent Application No. 20167023621 Office Action dated Feb. 27, 2018, 2 pages.
Korean Patent Application No. 20167023621 English translation of Office Action dated Feb. 27, 2018, 2 pages.
Korean Patent Application No. 20167023636 Office Action dated Jul. 24, 2018, 2 pages.
Korean Patent Application No. 20167023636 English translation of Office Action dated Jul. 24, 2018, 1 page.
Singapore Patent Application No. 11201606223P Office Action dated May 19, 2017, 8 pages.
Singapore Patent Application No. 11201606223P Office Action dated Jan. 9, 2018, 6 pages.
U.S. Appl. No. 15/115,045 Office Action dated Nov. 22, 2017, 15 pages.
U.S. Appl. No. 15/114,929 Office Action dated Jun. 22, 2018, 27 pages.
U.S. Appl. No. 15/115,251 Office Action dated Oct. 13, 2017, 42 pages.
U.S. Appl. No. 15/115,251 Office Action dated Feb. 20, 2018, 45 pages.
U.S. Appl. No. 15/115,251 Office Action dated Jun. 5, 2018, 47 pages.
U.S. Appl. No. 15/666,881 Office Action dated Jan. 22, 2018, 22 pages.
PCT/CN2014/076974 International Search Report dated Oct. 29, 2014, 4 pages.
PCT/CN2014/076974 English translation of International Search Report dated Oct. 29, 2014, 2 pages.
PCT/CN2014/077287 International Search Report dated Oct. 29, 2014, 4 pages.
PCT/CN2014/077287 English translation of International Search Report dated Sep. 29, 2014, 2 pages.
PCT/CN201/4077474 International Search Report dated Nov. 14, 2014, 5 pages.

(56) References Cited

OTHER PUBLICATIONS

PCT/CN201/4077474 English translation of International Search Report dated Nov. 14, 2014, 3 pages.
European Patent Application No. 15744077.7 Office Action dated May 24, 2018, 3 pages.
Chilean Patent Application No. 201601924 Office Action dated Mar. 7, 2018, 3 pages, 7 pages.
Translation of the International Search Report and Written Opinion corresponding to International Patent Application No. PCT/CN2015/070468, dated Apr. 13, 2015, 8 pages.
Canadian Patent Application No. 2937953, Office Action dated Jan. 18, 2018, 5 pages.
Chinese Patent Application No. 201410042541.0 First Office Action dated Jul. 17, 2015 with English translation, 10 pages.
Chinese Patent Application No. 201410043139.4 First Office Action dated Dec. 23, 2015 with English translation, 8 pages.
Canadian Patent Application No. 2,937,953, Office Action dated May 31, 2017, 7 pages.
Singapore Patent Application No. 1120160219X, Office Action dated Apr. 4, 2017, 13 pages.
Korean Patent Application No. 10-2016-7023544 English translation of Office Action dated Dec. 14, 2018, 5 pages.
Korean Patent Application No. 10-2016-7023544 Office Action dated Dec. 14, 2018, 5 pages.
European Patent Application No. 15744077.7 Office Action dated Oct. 12, 2018, 4 pages.
Canadian Patent Application No. 2,937,953 Office Action dated Sep. 19, 2018, 5 pages.
Chinese Patent Application No. 201580005214.0 English translation of Office Action dated Aug. 9, 2017, 6 pages.
Chinese Patent Application No. 201580005214.0 Office Action dated Aug. 9, 2017, 6 pages.
Japanese Patent Application No. 2016-549265 English translation of Notice of Allowance dated Dec. 19, 2017, 2 pages.
Japanese Patent Application No. 2016-549265 Notice of Allowance dated Dec. 19, 2017, 3 pages.
Brazilian Patent Application No. 11 2016 016943 3 English translation of Office Action dated Feb. 10, 2020, 3 pages.
Brazilian Patent Application No. 11 2016 016943 3 Office Action dated Feb. 10, 2020, 4 pages.
Chinese Patent Application No. 201610973222.0 English translation of Office Action dated Jul. 10, 2019, 5 pages.
Chinese Patent Application No. 201610973222.0 Office Action dated Jul. 10, 2019, 5 pages.
Indian Patent Application No. 201637028065 Office Action dated May 27, 2019, 5 pages.
Japanese Patent Application No. 2018-024364 English translation of Office Action dated Mar. 19, 2019, 3 pages.
Japanese Patent Application No. 2018-024364 Office Action dated Mar. 19, 2019, 3 pages.
Korean Patent Application No. 10-2018-7013989 first Office Action dated Aug. 14, 2018, 6 pages.
Korean Patent Application No. 10-2018-7013989 English translation of first Office Action dated Aug. 14, 2018, 6 pages.
Korean Patent Application No. 10-2018-7013989 second Office Action dated Feb. 28, 2019, 4 pages.
Korean Patent Application No. 10-2018-7013989 English translation of second Office Action dated Feb. 28, 2019, 4 pages.
Korean Patent Application No. 10-2018-7013989 third Office Action dated Apr. 24, 2019, 3 pages.
Korean Patent Application No. 10-2018-7013989 English translation of third Office Action dated Apr. 24, 2019, 13 pages.

Mexican Patent Application No. MX/a/2016/009853 Office Action dated Mar. 9, 2020, 6 pages.
Mexican Patent Application No. MX/a/2016/009853 English translation of Office Action dated Mar. 9, 2020, 5 pages.
Malaysian Patent Application No. PI 2016702707 Office Action dated Jul. 25, 2019, 4 pages.
Singapore Patent Application No. 11201606223P Office Action dated Oct. 29, 2018, 6 pages.
U.S. Appl. No. 15/596,950 Office Action dated Nov. 17, 2017, 9 pages.
U.S. Appl. No. 15/989,363 Office Action dated Oct. 25, 2019, 45 pages.
U.S. Appl. No. 15/989,363 Office Action dated Apr. 15, 2020, 12 pages.
U.S. Appl. No. 15/989,363 Office Action dated Jul. 20, 2020, 12 pages.
Indian Patent Application No. 201637028356 Office Action dated Apr. 26, 2019, 8 pages.
Korean Patent Application No. 10-2018-7026460 English translation of Notice of Allowance dated May 27, 2019, 3 pages.
Korean Patent Application No. 10-2018-7026460 Notice of Allowance dated May 27, 2019, 2 pages.
U.S. Appl. No. 15/115,251 Office Action dated Oct. 16, 2018, 46 pages.
U.S. Appl. No. 15/115,251 Advisory Action dated Jan. 24, 2019, 3 pages.
U.S. Appl. No. 15/115,251 Office Action dated Apr. 1, 2019, 39 pages.
Chinese Patent Application No. 201810220714.1 English translation of Office Action dated Nov. 17, 2020, 20 pages.
Chinese Patent Application No. 201810220714.1 Office Action dated Nov. 17, 2020, 20 pages.
U.S. Appl. No. 15/989,363 Office Action dated Nov. 19, 2020, 11 pages.
European Patent Application No. 15744077.7 Office Action dated Apr. 22, 2020 3 pages.
Mexican Patent Application No. MXa2016009854 Office Action dated Mar. 10, 2020, 5 pages.
Mexican Patent Application No. MXa2016009854 English translation of Office Action dated Mar. 10, 2020, 4 pages.
Philippine Patent Application No. 1-2016-501486 Office Action dated Aug. 20, 2020, 5 pages.
U.S. Appl. No. 15/989,363 Office Action dated Apr. 23, 2021, 11 pages.
U.S. Appl. No. 15/900,281 Final Office Action dated Apr. 2, 2021, 46 pages.
U.S. Appl. No. 15/900,281 Office Action dated Nov. 27, 2020, 38 pages.
Chinese Patent Application No. 201810220714.1 Office Action dated Jun. 29, 2021, 18 pages.
Chinese Patent Application No. 201810220714.1 English translation of Office Action dated Jun. 29, 2021, 29 pages.
European Patent Application No. 15744077.7 Office Action dated Jul. 5, 2021, 4 pages.
Chinese Patent Application No. 201810220714.1 Decision on Rejection dated Dec. 3, 2021, 13 pages.
Chinese Patent Application No. 201810220714.1 Decision on Rejection dated Dec. 3, 2021, 15 pages.
European Patent Application No. 15744077.7, Office Action dated Feb. 14, 2022, 4 pages.
Chinese Patent Application No. 201810220714.1, Office Action dated Mar. 22, 2022, 22 pages.
Chinese Patent Application No. 201810220714.1, English translation of Office Action dated Mar. 22, 2022, 26 pages.

* cited by examiner

US 11,342,765 B2

TERMINAL, POWER ADAPTER AND METHOD FOR HANDLING CHARGING ANOMALY

CROSS-REFERENCE TO RELATED APPLICATIONS

This application is a U.S. national phase application based on International Application No. PCT/CN2015/070468, filed on Jan. 9, 2015, which is based on and claims priority to Chinese Patent Application Nos. 201410042541.0, 201410043139.4, 201410043218.5, all filed on Jan. 28, 2014, the entire contents of which are incorporated herein by reference.

TECHNICAL FIELD

Embodiments of the present disclosure relate to the charging field, and more specifically, relate to a terminal, a power adapter and a method for handling a charging anomaly.

BACKGROUND

Typically, a battery in an electronic device is charged by a way of coupling a charging interface of the electronic device with an external power adapter. In order to reduce charging time during charging the battery, the charging current can be enhanced for realizing a quick charging on the battery in the related art. However, if an anomaly occurs in a charging loop, for example, an output voltage of the power adapter is an over-voltage and/or an output current of the power adapter is an over-current, the battery will be damaged no matter whether the battery is charged in a conventional constant voltage mode or with increased charging current. The anomaly in the charging loop cannot be detected and handled in the related art, such that the safety during the charging is poor.

SUMMARY

Embodiments of the present disclosure provide a terminal, a power adapter and a method for handling a charging anomaly.

In at least one embodiment, a terminal is provided. The terminal includes a battery and a charging interface. The terminal is configured to form a charging loop with a power adapter via the charging interface, so as to charge the battery. The terminal further includes a communication unit, an anomaly detection unit and an anomaly handling unit. The communication unit is configured to receive charging parameter information from the power adapter. The anomaly detection unit is configured to determine, according to the charging parameter information, whether an anomaly occurs on the charging loop. The anomaly handling unit is configured to control the charging loop to enter into a protection state if the anomaly occurs on the charging loop.

In at least one embodiment, a power adapter is provided. The power adapter includes a power conversion unit and a charging interface. The power conversion unit is configured to form a charging loop with a terminal via the charging interface, so as to charge a battery of the terminal. The power adapter further includes a communication unit and an anomaly handling unit. The communication unit is configured to receive charging protection indication information from the terminal. The anomaly handling unit is configured to control the charging loop to enter into a protection state, according to an indication of the charging protection indication information.

In at least one embodiment, the method further includes: sending, by the terminal, charging protection indication information to the power adapter, so as to indicate the power adapter to control the charging loop to enter into the protection state if the anomaly occurs on the charging loop.

In at least one embodiment, a method for handling a charging anomaly is provided. The method includes: receiving, by a power adapter, charging protection indication information from a terminal; and controlling, by the power adapter, a charging loop between the power adapter and the terminal to enter into a protection state according to an indication of the charging protection indication information.

BRIEF DESCRIPTION OF THE DRAWINGS

In order to make the technical solutions of embodiments of the present disclosure more clearly, the accompanying drawings used in the description of embodiments of the present disclosure are briefly described hereunder. Obviously, the described drawings are merely some embodiments of present disclosure. For those skilled in the art, other drawings can be obtained based on these drawings without any creative work.

DETAILED DESCRIPTION

The technical solutions in embodiments of the present disclosure will be given a clear and complete description with reference to the accompanying drawings in the embodiments of the present disclosure. Obviously, the described embodiments are merely a part of embodiments of the present disclosure, rather than all embodiments of the present disclosure. All other embodiments obtained by those skilled in the art based on embodiments of the present disclosure without creative efforts shall fall within the protection scope of the present disclosure.

Figure 1:
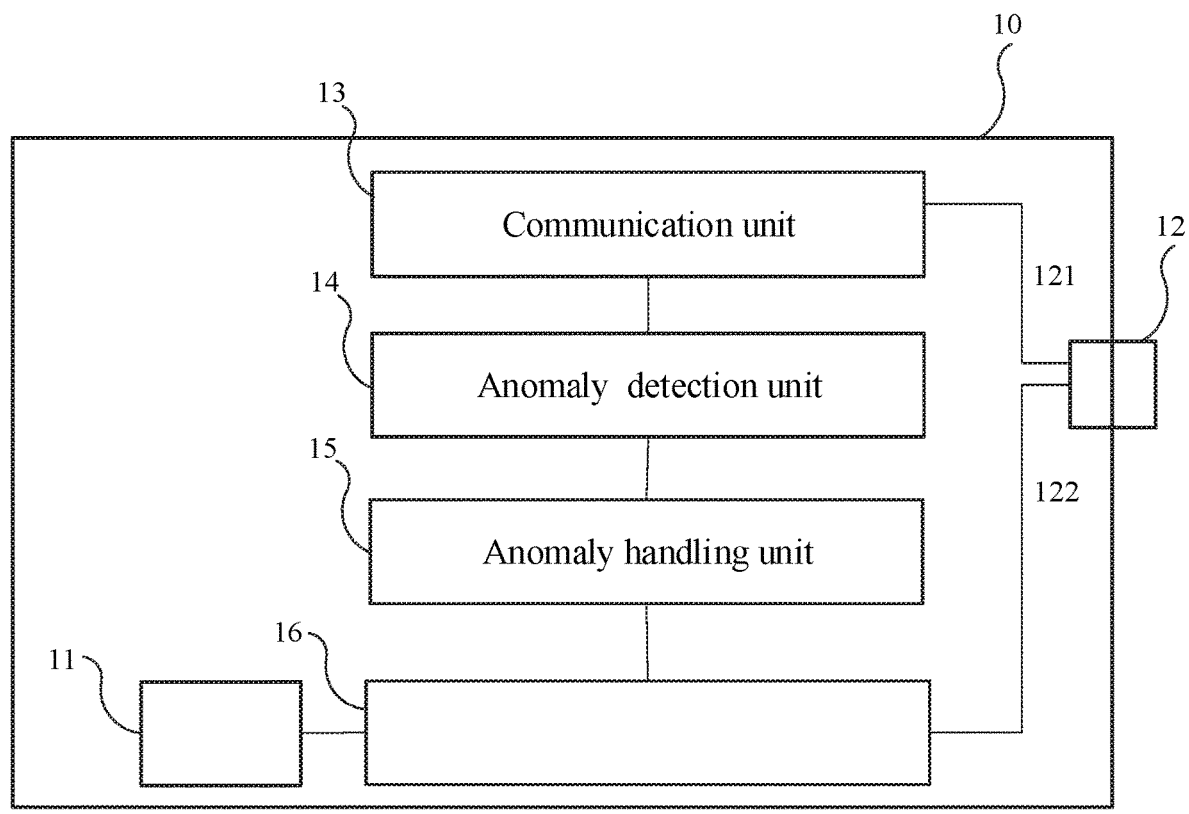
FIG. 1 is a block diagram of a terminal in accordance with an exemplary embodiment of the present disclosure.

FIG. 1 is a block diagram of a terminal in accordance with an exemplary embodiment of the present disclosure. The terminal 10 shown in FIG. 1 may include a battery 11 and a charging interface 12. The charging circuit 16 is configured to connect the charging interface 12 of the terminal 10 and the battery 11 of the terminal 10. The charging circuit 16 is configured to acquire the power from the charging interface 12 of the terminal 10 to charge the battery 11 of the terminal 10. The terminal 10 is configured to form a charging loop with a power adapter via the charging interface 12 and the charging circuit 16, so as to charge the battery 11. The terminal 10 further includes a communication unit 13, an anomaly detection unit 14 and an anomaly handling unit 15. The communication unit 13 is configured to receive charging parameter information from the power adapter. The anomaly detection unit 14 is configured to determine, according to the charging parameter information, whether an anomaly occurs on the charging loop. The anomaly handling unit 15 is configured to control the charging loop to enter into a protection state if the anomaly occurs on the charging loop.

In the embodiments of the present disclosure, the terminal receives the charging parameter information from the power adapter, and determines, according to the charging parameter information, whether the anomaly occurs on the charging loop. The terminal controls the charging loop to enter into the protection state if the anomaly occurs on the charging loop, so as to improve the safety of the charging process.

In at least one embodiment, the communication unit 13 is further configured to send charging protection indication information to the power adapter if the anomaly occurs on the charging loop, so as to indicate the power adapter to control the charging loop to enter into the protection state.

In the embodiments of the present disclosure, when the anomaly occurs on the charging loop, the terminal not only actively controls the charging loop to enter into the protection state, but also notifies the power adapter to control the charging loop to enter into the protection state. In this case, even if the anomaly handling unit of the terminal fails to control the charging loop to enter into the protection state, the power adapter can be still used to control the charging loop to enter into the protection state, thereby further improving the safety of the charging process.

In at least one embodiment, the charging interface includes power wires 122 and data wires 121. The terminal 10 is configured to form the charging loop with the power adapter via the charging interface 12, so as to charge the battery, and specifically to: form the charging loop with the power adapter via the power wires 122 in the charging interface 12, so as to charge the battery. The communication unit 13 is configured to receive the charging parameter information from the power adapter, and specifically to: receive the charging parameter information from the power adapter via the data wires 121 in the charging interface.

For example, the charging interface can be a USB (Universal Serial Bus) interface or a micro USB interface. The above-mentioned power wires can be power wires in the USB interface, such as +5V and −5V power wires; the above-mentioned data wires can be data wires in the USB interface, such as a D+ wire and a D− wire.

In at least one embodiment there may be several reasons causing the anomaly of the charging loop, for example, an overvoltage output and an overcurrent output of the power adapter, etc. The detection and handling manners of different anomalies may be different. An illustration to the detection and handling manners of various anomalies is provided below in conjunction with specific embodiments.

In at least one embodiment, the charging parameter information includes an output voltage of the power adapter. The anomaly detection unit 14 is configured to, according to the charging parameter information, determine whether the anomaly occurs on the charging loop, and specifically to: compare the output voltage with a voltage threshold, and determine the overvoltage output of the power adapter and the anomaly occurring on the charging loop if the output voltage is higher than the voltage threshold.

In at least one embodiment, the above-mentioned voltage threshold can be set according to the specific model of the terminal 10 and the power adapter, or can also be set according to experience.

In at least one an embodiment, the charging parameter information includes an output current of the power adapter. The anomaly detection unit 14 is configured to, according to the charging parameter information, determine whether the anomaly occurs on the charging loop, and specifically to: compare the output current with a current threshold, and determine the overcurrent output and the anomaly occurring on the charging loop if the output current is higher than the current threshold.

In at least one embodiment, the above-mentioned current threshold can be set according to the specific model of the terminal 10 and the power adapter, or can also be set according to experience.

In conjunction with FIG. 1, as described above, the terminal in the embodiments of the present disclosure is described in detail; in conjunction with FIG. 2, the power adapter in the embodiments of the present disclosure is described hereinafter in detail. It should be noted that the interaction and related features, and functions of the terminal and power adapter described at the terminal side corresponds to that at the power adapter side; for the sake of brevity, repeated description shall be omitted appropriately.

Figure 2:
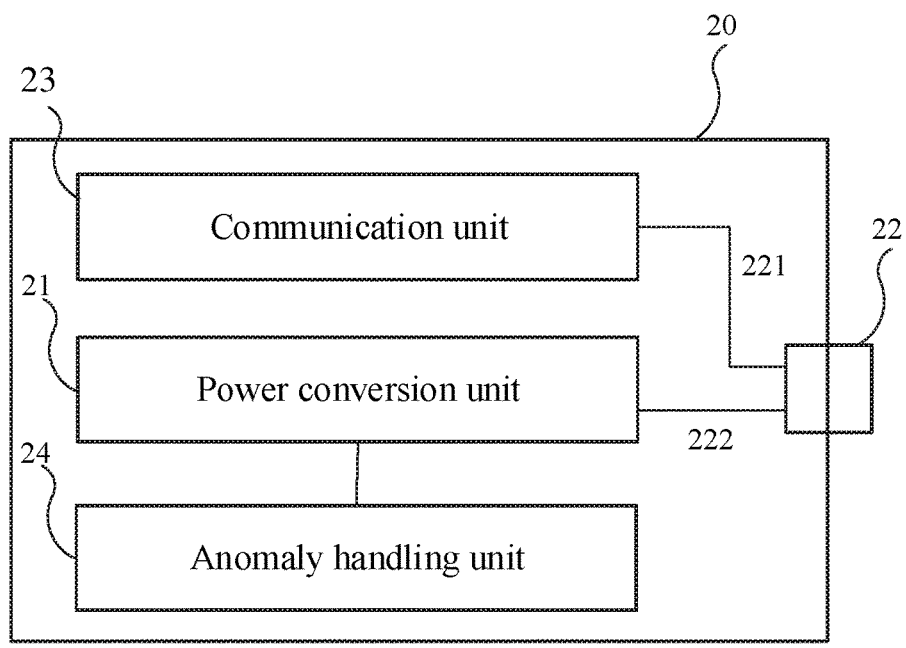
FIG. 2 is a block diagram of a power adapter in accordance with an exemplary embodiment of the present disclosure.

FIG. 2 is a block diagram of a power adapter in accordance with an exemplary embodiment of the present disclosure. The power adapter 20 shown in FIG. 2 includes a power conversion unit 21 and a charging interface 22. The power conversion unit 21 is configured to form a charging loop with the terminal via the charging interface 22, so as to charge the battery of the terminal. The power adapter 20 further includes a communication unit 23 and an anomaly handling unit 24. The communication unit 23 is configured to receive charging protection indication information from the terminal. The anomaly handling unit 24 is configured to control the charging loop to enter into a protection state according to an indication of the charging protection indication information.

In the embodiments of the present disclosure, when the anomaly occurs on the charging loop, the communication unit of the power adapter receives the charging protection indication information from the terminal, and controls the charging loop to enter into the protection state according to the indication of the charging protection indication information, thereby improving the safety of the charging process.

In at least one embodiment, the power adapter 20 is contacted with the terminal via the charging interface 22. The charging interface 22 includes power wires 222 for charging and data wires 221. The communication unit 23 is configured to receive the charging protection indication information from the terminal, and specifically to: receive the charging protection indication information from the terminal via the data wires 221 in the charging interface 22.

For example, the charging interface can be a USB (Universal Serial Bus) interface or a micro USB interface. The above-mentioned power wires can be power wires in the USB interface, such as +5V and −5V power wires; the above-mentioned data wires can be data wires in the USB interface, such as a D+ cable and a D− cable.

In at least one embodiment, the communication unit 23 is further configured to send charging parameter information to the terminal. The charging parameter information is used for the terminal to determine whether an anomaly occurs on the charging loop.

In at least one embodiment, the charging parameter information includes at least one of an output voltage and an output current of the power adapter 20.

In conjunction with FIG. 1 and FIG. 2, as described above, the terminal and the power adapter according to the embodiments of the present disclosure are described in detail. In conjunction with FIG. 3 and FIG. 4, the method for handling a charging anomaly according to the embodiments of the present disclosure is described hereinafter in detail. It should be noted that the method for handling a charging anomaly in FIG. 3 can be performed by the terminal 10 in FIG. 1. The method of handling a charging anomaly in FIG. 4 can be performed by the power adapter in FIG. 2. In order to avoid repetition, repeated description shall be omitted appropriately.

Figure 3:
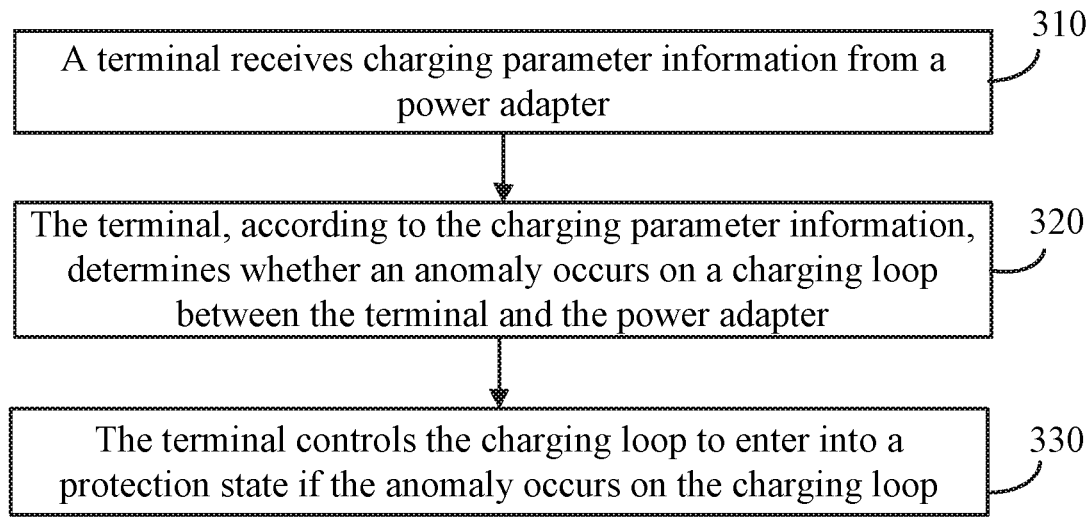
FIG. 3 is a flowchart of a method for handling a charging anomaly in accordance with an exemplary embodiment of the present disclosure.

FIG. 3 is a schematic flowchart of a method for handling a charging anomaly in the embodiments of the present disclosure. The method of FIG. 3 includes followings.

In 310, a terminal receives charging parameter information from a power adapter.

In 320, the terminal, according to the charging parameter information, determines whether an anomaly occurs on a charging loop between the terminal and the power adapter.

In 330, the terminal controls the charging loop to enter into a protection state if the anomaly occurs on the charging loop.

In the embodiments of the present disclosure, the terminal receives the charging parameter information, and according to the charging parameter information, determines whether the anomaly occurs on the charging loop. The terminal controls the charging loop to enter into the protection state if the anomaly occurs on the charging loop, so as to improve the safety of the charging process.

In at least one embodiment, the method in FIG. 3 further includes: sending, by the terminal, charging protection indication information to the power adapter if the anomaly occurs on the charging loop, so as to indicate the power adapter to control the charging loop to enter into the protection state.

In at least one embodiment, the terminal includes a charging interface. The charging interface includes data wires and power wires for charging. The terminal is configured to receive the charging parameter information from the power adapter, and specifically to receive the charging parameter information from the power adapter via the data wires in the charging interface.

In at least one embodiment, the terminal is configured to control the charging loop to enter into the protection state by an act of reducing an input voltage of the power adapter; or reducing an input current of the power adapter; or disconnecting the charging loop.

In at least one embodiment, the anomaly of the charging loop includes at least one of: overvoltage output and overcurrent output of the power adapter.

In at least one embodiment, the charging parameter information includes an output voltage of the power adapter. Determining, by the terminal according to the charging parameter information, whether the anomaly occurs on the charging loop between the terminal and the power includes: comparing, by the terminal, the output voltage with a voltage threshold; and determining by the terminal, the overvoltage output of the power adapter and the anomaly occurring on the charging loop if the output voltage is higher than the voltage threshold.

In at least one embodiment, the charging parameter information includes an output current of the power adapter. Determining, by the terminal according to the charging parameter information, whether the anomaly occurs on the charging loop between the terminal and the power includes: comparing, by the terminal, the output current with a current threshold; and determining, by the terminal, the overcurrent output of the power adapter and the anomaly occurring on the charging loop if the output current overcurrent is higher than the current threshold.

Figure 4:
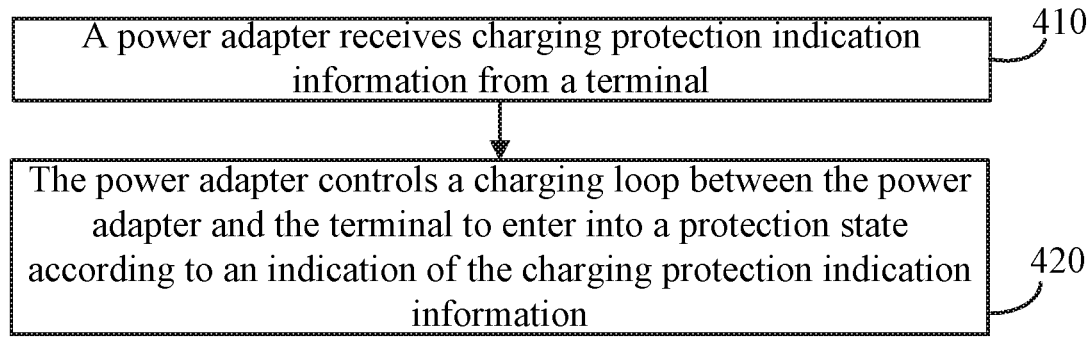
FIG. 4 is a flowchart of a method for handling a charging anomaly in accordance with an exemplary embodiment of the present disclosure.

Referring to FIG. 4, a flow chart is presented in accordance with an exemplary embodiment which is thus illustrated. The method shown in FIG. 4 includes followings.

In 410, a power adapter receives charging protection indication information from a terminal;

In 420, the power adapter controls a charging loop between the power adapter and the terminal to enter into a protection state according to an indication of the charging protection indication information.

In the embodiments of the present disclosure, if an anomaly occurs on the charging loop, the power adapter receives the charging protection indication information from the terminal, and according to the indication of the charging protection indication information, controls the charging loop to enter into the protection state, thereby improving the safety of the charging process.

In at least one embodiment, the power adapter is contacted with the terminal via the charging interface. The charging interface includes power wires for charging and data wires. Receiving, by the power adapter, the charging protection indication information from the terminal, includes: receiving, by the power adapter, the charging protection indication information from the terminal via the data wires in the charging interface.

In at least one embodiment, the method of FIG. 4 further includes: sending, by the power adapter, charging parameter information to the terminal. The charging parameter information is used for the terminal to determine whether an anomaly occurs on the charging loop.

In at least one embodiment, the charging parameter information includes at least one of an output voltage and an output current of the power adapter.

Those skilled in the art can realize that, the units and algorithm steps in conjunction with all examples described in the embodiments disclosed in this specification are able to be implemented by electronic hardware, or a combination of computer software and electronic hardware. Whether these functions are performed by hardware or software depends on specific applications and design constraint conditions of the technical solutions. For each specific application, those skilled in the art can realize the described functions by using different methods, but this realization shall not be considered beyond the scope of the present disclosure.

It would be appreciated by those skilled that, for convenience and simplicity of the description, the specific working process of the systems, devices and units as described above can refer to the corresponding process in the above-mentioned method embodiments, and no further details hereto will be given.

In several embodiments provided in this application, it should be understood that the disclosed systems, devices and methods can be realized by other manners. For example, the above-described embodiments are only schematic; for example, the division of said unit is only a logic function division; there may be additional dividing manners during the actual implementation. For example, multiple units or components may be combined or integrated into another system, or some features can be ignored, or not implemented. Another point, the displayed or discussed mutual coupling or direct coupling or communication connection may be via some interfaces, indirect coupling or communication connection of devices or units, in electronic, mechanical, or other forms.

Said unit described as a separation part may be or may not be separated physically; the part displayed as a unit may be or may not be a physical unit, namely it can be located in one place, or can be distributed to multiple network units. Part or all of the units can be selected according to actual needs to achieve the purpose of the embodiment.

In addition, all functional units in the embodiments of the present disclosure can be integrated in one processing unit, or each unit exists individually in physical form, or two or more units are integrated in one unit.

If said function is realized in the form of software function unit and sold or used as an independent product, it can be stored in a computer readable storage medium. With such an understanding, the technical solution of the present disclosure substantially or its portion that contributes to the prior art or a portion of the technical solution may embody in the form of a computer software product which is stored in a memory media, including a plurality of instructions such that a computer (may be a personal computer, a server, or a network device, etc.) executes all or some steps of the methods described in each of all the embodiments. And the previously mentioned memory media include such media capable of storing program codes as USB flash disk, portable hard drive, read-only memory (ROM), random access memory (RAM), floppy disk or compact disk.

The above descriptions are only specific embodiments of the present disclosure, but not intended to limit the protection scope of the present disclosure. The variation or replacement easily thought of by those of skill in the art within the technical scope disclosed by the present disclosure, shall fall within the protection scope of the present disclosure. Therefore, the protection scope of the present disclosure shall be determined with reference to the protection scope of the claims.

What is claimed is:

1. A terminal device, comprising: a battery, and a Universal Serial Bus (USB) interface of the terminal device; the terminal device being configured to form a charging loop with a power adapter via the USB interface, so as to charge the battery; wherein, the USB interface comprises power wires, a D+ wire, and a D− wire; the terminal device forms the charging loop with the power adapter via the power wires in the USB interface, so as to charge the battery; the terminal device further comprises:
   a processor; and
   a non-transitory computer readable storage medium storing a plurality of instructions that, when executed by the processor, cause the terminal device to:
      receive an output voltage of the power adapter from the power adapter via the D+ wire and the D− wire in the USB interface;
      compare the output voltage received via the D+ wire and the D− wire in the USB interface with a voltage threshold;
      determine overvoltage output and an anomaly occurring on the charging loop when the output voltage received via the D+ wire and the D− wire in the USB interface is higher than the voltage threshold;
      control the charging loop to enter into a protection state in response that the anomaly occurs on the charging loop, and,
      send charging protection indication information to the power adapter to indicate the power adapter to control the charging loop to enter into the protection state in response that the anomaly occurs on the charging loop.

2. The terminal device according to claim 1, the terminal device comprising further instructions that, when executed by the processor, further cause the terminal device to:
   reduce an input voltage from the power adapter to the terminal device;
   reduce an input current from the power adapter to the terminal device; or
   disconnect the charging loop.

3. The terminal device according to claim 1, the terminal device comprising further instructions that, when executed by the processor, further cause the terminal device to,
   receive an output current of the power adapter from the power adapter via the D+ wire and the D− wire in the USB interface;
   compare the output current received via the D+ wire and the D− wire in the USB interface with a current threshold; and
   determine overcurrent output and the anomaly occurring on the charging loop in response that the output current received via the D+ wire and the D− wire in the USB interface is higher than the current threshold.

4. A method for handling a charging anomaly, wherein, the terminal device comprises a USB interface, the USB interface comprises power wires, a D+ wire, and a D− wire for charging, the method comprising:
   receiving, by a terminal device, an output voltage of a power adapter from the power adapter via the D+ wire and the D− wire in the USB interface;
   comparing, by the terminal device, the output voltage received via the D+ wire and the D− wire in the USB interface with a voltage threshold;
   determining, by the terminal device, overvoltage output and an anomaly occurring on the charging loop when the output voltage received via the D+ wire and the D− wire in the USB interface is higher than the voltage threshold;
   controlling, by the terminal device, the charging loop to enter into a protection state in response that the anomaly occurs on the charging loop; and
   sending, by the terminal device, charging protection indication information to the power adapter to indicate the power adapter to control the charging loop to enter into the protection state, in response that the anomaly occurs on the charging loop.

5. The method according to claim 4, wherein, controlling, by the terminal device, the charging loop to enter into the protection state comprises:
   reducing, by the terminal device, an input voltage from the power adapter to the terminal device;
   reducing, by the terminal device, an input current from the power adapter to the terminal device; or
   disconnecting, by the terminal device, the charging loop.

6. The method according to claim 4, further comprising:
   receiving, by the terminal device, an output current of the power adapter from the power adapter via the D+ wire and the D− wire in the USB interface;
   comparing, by the terminal device, the output current received via the D+ wire and the D− wire in the USB interface with a current threshold; and
   determining, by the terminal device, overcurrent output of the power adapter and the anomaly occurring on the charging loop response that the output current received via the D+ wire and the D− wire in the USB interface is higher than the current threshold.

* * * * *